(12) United States Patent
Röhm

(10) Patent No.: US 6,902,172 B2  
(45) Date of Patent: Jun. 7, 2005

(54) DRILL CHUCK WITH CUSHIONED TIGHTENING SLEEVE

(75) Inventor: Günter Horst Röhm, Sontheim (DE)

(73) Assignee: Rohm GmbH, Sontheim (DE)

( * ) Notice: Subject to any disclaimer, the term of this patent is extended or adjusted under 35 U.S.C. 154(b) by 122 days.

(21) Appl. No.: 10/457,870

(22) Filed: Jun. 10, 2003

(65) Prior Publication Data

US 2004/0032095 A1 Feb. 19, 2004

(30) Foreign Application Priority Data

Jun. 13, 2002 (DE) .......................................... 102 26 429

(51) Int. Cl.⁷ .............................................. B23B 31/16
(52) U.S. Cl. ........................................ 279/62; 279/902
(58) Field of Search ............................. 279/60, 61, 62, 279/75, 125, 140, 902

(56) References Cited

U.S. PATENT DOCUMENTS

| 5,145,192 A | | 9/1992 | Rohm | |
|---|---|---|---|---|
| 5,145,193 A | | 9/1992 | Rohm | |
| 5,145,194 A | | 9/1992 | Huff | |
| 5,431,419 A | * | 7/1995 | Mack | 279/62 |
| 5,503,409 A | * | 4/1996 | Rohm | 279/62 |
| 5,732,956 A | | 3/1998 | Huff | |
| 5,765,839 A | * | 6/1998 | Rohm | 279/62 |
| 5,816,583 A | * | 10/1998 | Middleton | 279/62 |
| 5,829,761 A | * | 11/1998 | Rohm | 279/62 |
| 5,988,958 A | * | 11/1999 | Mack | 408/240 |
| 6,070,884 A | * | 6/2000 | Mack | 279/62 |
| 6,260,857 B1 | | 7/2001 | Wienhold | |
| 6,575,478 B2 | * | 6/2003 | Rohm et al. | 279/62 |
| 6,581,942 B2 | * | 6/2003 | Rohm | 279/62 |
| 2002/0022442 A1 | | 2/2002 | Rohm | |
| 2003/0080521 A1 | * | 5/2003 | Mack | 279/62 |

FOREIGN PATENT DOCUMENTS

| EP | 0325284 | 7/1989 |
|---|---|---|
| EP | 0519412 | 12/1992 |

* cited by examiner

Primary Examiner—Daniel W. Howell  
Assistant Examiner—Michael W. Talbot  
(74) Attorney, Agent, or Firm—Herbert Dubno; Andrew Wilford

(57) ABSTRACT

A drill chuck has a chuck body centered on a longitudinal axis and formed with a plurality of forwardly open angled guides spaced about the axis. Respective jaws displaceable along the guides in the chuck body are each formed with a row of teeth. A tightening sleeve rotatably surrounding the body is axially fixed to a ring rotatable on the body about the axis and formed with a screwthread meshing with the teeth of the jaws so that rotation of the sleeve and ring in one direction moves the jaws radially together and opposite rotation moves them radially apart, A first axially elastically deformable spring seated in the chuck body bears axially forward on the ring, and a second axially elastically deformable spring seated in the chuck body bears axially rearward on the sleeve.

19 Claims, 8 Drawing Sheets

DRILL CHUCK WITH CUSHIONED TIGHTENING SLEEVE

FIELD OF THE INVENTION

The present invention relates to a drill chuck. More particularly this invention concerns a hammer-drill chuck that is tightened and loosened without the use of a chuck key.

BACKGROUND OF THE INVENTION

A drill chuck has as described in U.S. Pat. Nos. 5,145,192 and 5,145,193 a chuck body centered on and adapted to be rotated about a longitudinal axis and unitarily formed with a plurality of forwardly open angled guides angularly spaced about the axis and an axially forwardly directed shoulder. Respective jaws displaceable along the guides in the chuck body are each formed with a row of teeth and a tightening sleeve rotatably surrounds the body and has an axially rearwardly directed shoulder. An inner ring rotatable on the body about the axis is formed internally with a screwthread meshing with the teeth of the jaws so that rotation of the inner ring in one direction moves the jaws radially together and opposite rotation moves them radially apart. This inner ring bears axially forward on the shoulder of the sleeve and axially backward on the shoulder of the body. Interengaging formations rotationally couple the inner ring to the sleeve and a retaining element axially fixed on the chuck body forward of the inner ring bears axially backward on the sleeve. With the system of this prior invention the chuck body has axially rearward of the interengaging formations a predetermined outside diameter and the sleeve has axially rearward of the interengaging formations a predetermined inside diameter greater than the outside diameter of the body. The ring has a predetermined outside diameter smaller than the inside diameter of the sleeve so that the ring can be fitted axially forward into the sleeve and the sleeve and ring together can be fitted axially backward over the body.

While this prior-art chuck is easy to assemble and use, it has the disadvantage that, in particular when hammer-drilling, it vibrates excessively, making tightening and loosening difficult. Furthermore when tightened or loosened by hand it is difficult to control the maximum torque.

OBJECTS OF THE INVENTION

It is therefore an object of the present invention to provide an improved keyless hammer-drill chuck.

Another object is the provision of such an improved keyless hammer-drill chuck which overcomes the above-given disadvantages, that is which is easy to tighten and loosen and where vibration is less of a problem.

SUMMARY OF THE INVENTION

A drill chuck has according to the invention a chuck body centered on and adapted to be rotated about a longitudinal axis and unitarily formed with a plurality of forwardly open angled guides angularly spaced about the axis and with a rim. Respective jaws displaceable along the guides in the chuck body are each formed with a row of teeth. A tightening sleeve rotatably surrounding the body is axially fixed to a ring rotatable on the body about the axis and formed with a screwthread meshing with the teeth of the jaws so that rotation of the sleeve and ring in one direction moves the jaws radially together and opposite rotation moves them radially apart. A first axially elastically deformable spring seated in the chuck body bears axially forward on the ring, and a second axially elastically deformable spring seated in the chuck body bears axially rearward on the sleeve. The rim bears on the chuck body on axial rearward displacement of the sleeve relative to the chuck body.

With such a drill chuck, rotating the tightening sleeve in the tightening direction to move the jaws radially against a tool shank in the chuck will, once the jaws seat on the tool shank, cause the first spring to deform and allow the sleeve to shift axially rearward until its rim bears on the chuck body. From here on in the sleeve is solidly guided and can be rotated to bring considerable torque to bear on the tool. Any vibration will be effectively damped by the springs. Before the jaws actually contact the tool and the sleeve starts to press on the chuck body, the sleeve turns very freely.

According to the invention the sleeve has an axially rearwardly directed shoulder and the ring is pressed axially forwardly thereagainst by the first spring. Thus the axial rearward movement of the sleeve is assisted by the second spring, as is the loosening movement of the sleeve. The second spring is a spring washer bearing at the rear end of the chuck body on a snap ring set in the rear end of the tightening sleeve. This construction makes it very easy to assemble the chuck by slipping the sleeve rearward over the chuck body and snapping the snap ring in once all the parts are in place. Once assembled the tightening ring is guided at its front and rear ends on the chuck body rather than just on the tightening ring as in the prior art.

The body has an axially forwardly directed shoulder bearing on the first spring and the first spring projects radially substantially past the shoulder. More particularly between 25% and 70% of the first spring bears directly on the shoulder. The tightening ring bears backward on the first spring radially outward of the shoulder so the first spring can deform rearward.

Since no substantial pressure is required to damp vibration and guide the tightening sleeve, on tightening of the chuck the sleeves,moves axially backward on the chuck body with elastic deformation of the first spring through a predetermined distance and when the chuck is loose the chuck-body rim is spaced the distance from the chuck body. The sleeve rim is axially forward of the ring and is formed as an inwardly projecting ridge at a front end of the chuck body. Furthermore an elastically deformable body is provided between the rim and the chuck body. This elastically deformable body can be a ring or a lip on the sleeve. This lip is unitarily formed with the sleeve.

The ring according to the invention is formed unitarily of a single piece. As a result it is quite strong and inexpensive to manufacture. It is of reduced diameter since it fits inside the sleeve.

The chuck according to the invention further has a latch mechanism engaged between the sleeve and the body for inhibiting rotation of the sleeve on the body and keeping the chuck tight during a drilling operation. This mechanism includes an intermediate sleeve fixed angularly to the ring, a radially displaceable latch member operable by tightening sleeve and angularly coupled to the intermediate sleeve, and teeth angularly fixed relative to the body and latchingly engageable with the latch member. The teeth can be formed on the first spring or on the chuck body, and can have an axial length longer than the axial travel of the sleeve on the chuck body.

It is also within the scope of the invention to provide a shield cap rotatable on the sleeve at a front end of the chuck body. The sleeve carries a mounting nut formed with an outwardly open groove and the cap has a radially inwardly projecting formation set in the nut so it can rotate, as when the end of the chuck abuts a workpiece.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
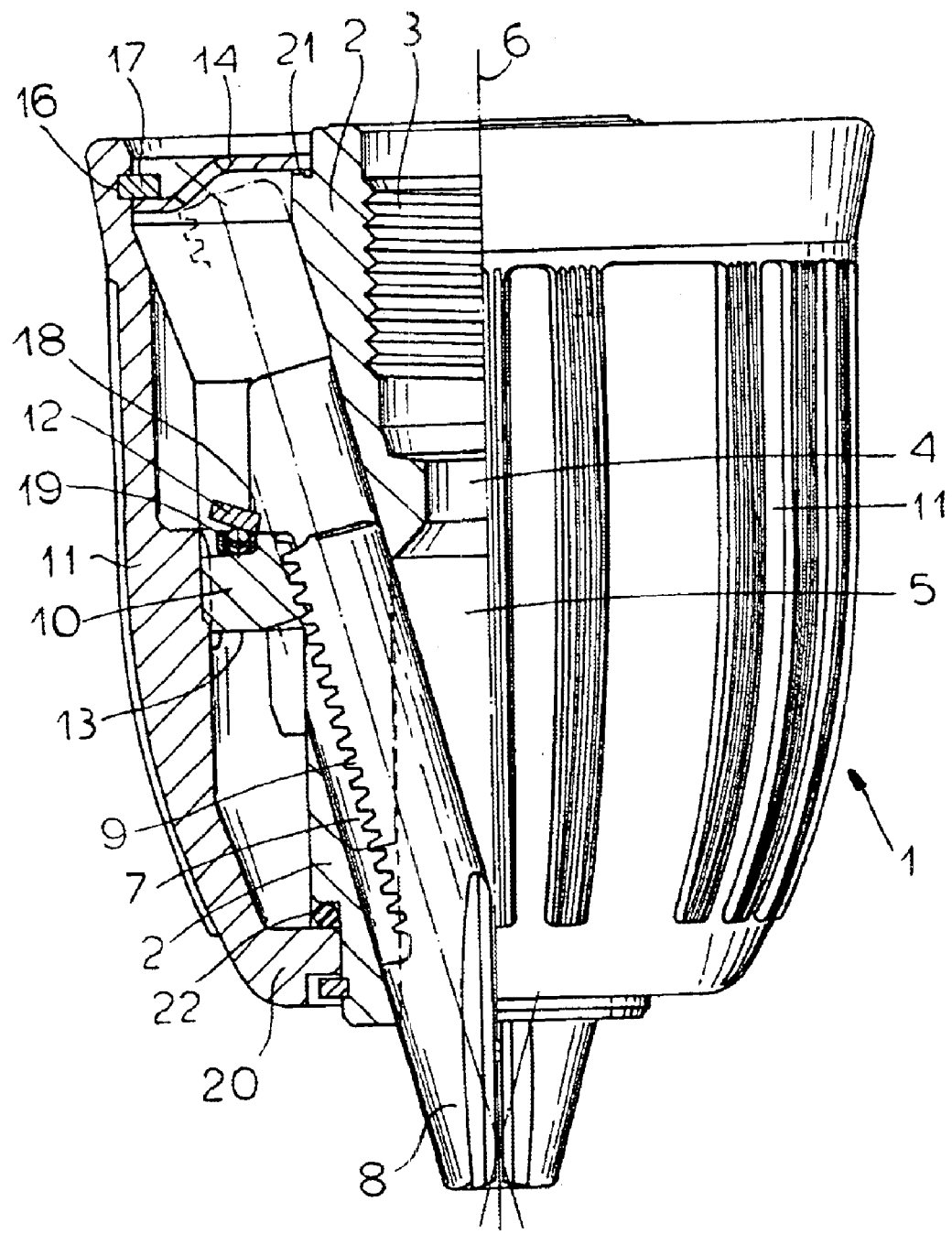
FIG. 1 is a side view partly in axial section through a chuck according to the invention in the tightened position.
Figure 2:
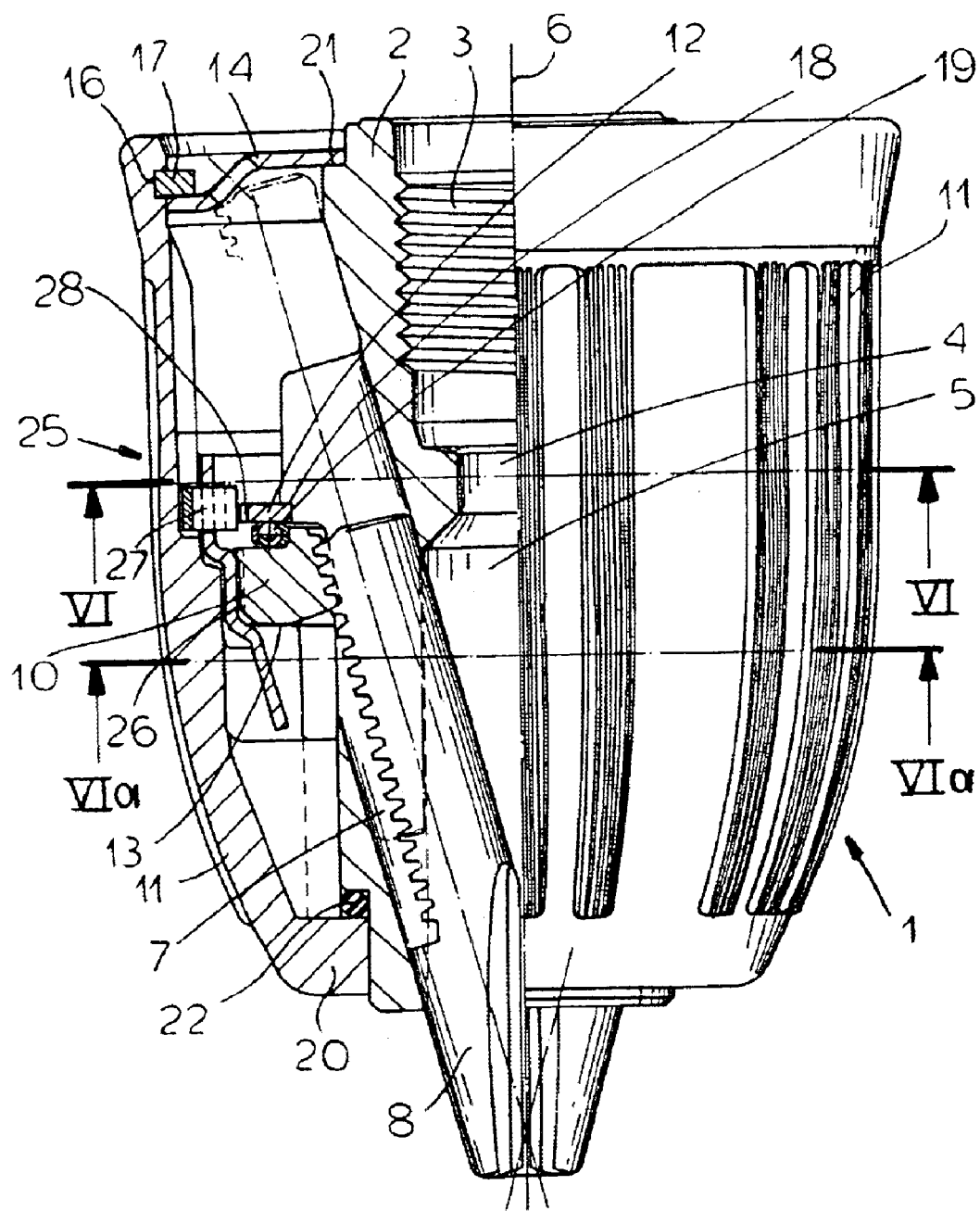
FIG. 2 is a view like FIG. 1 but with the chuck loosened and equipped with a locking mechanism.
Figure 3:
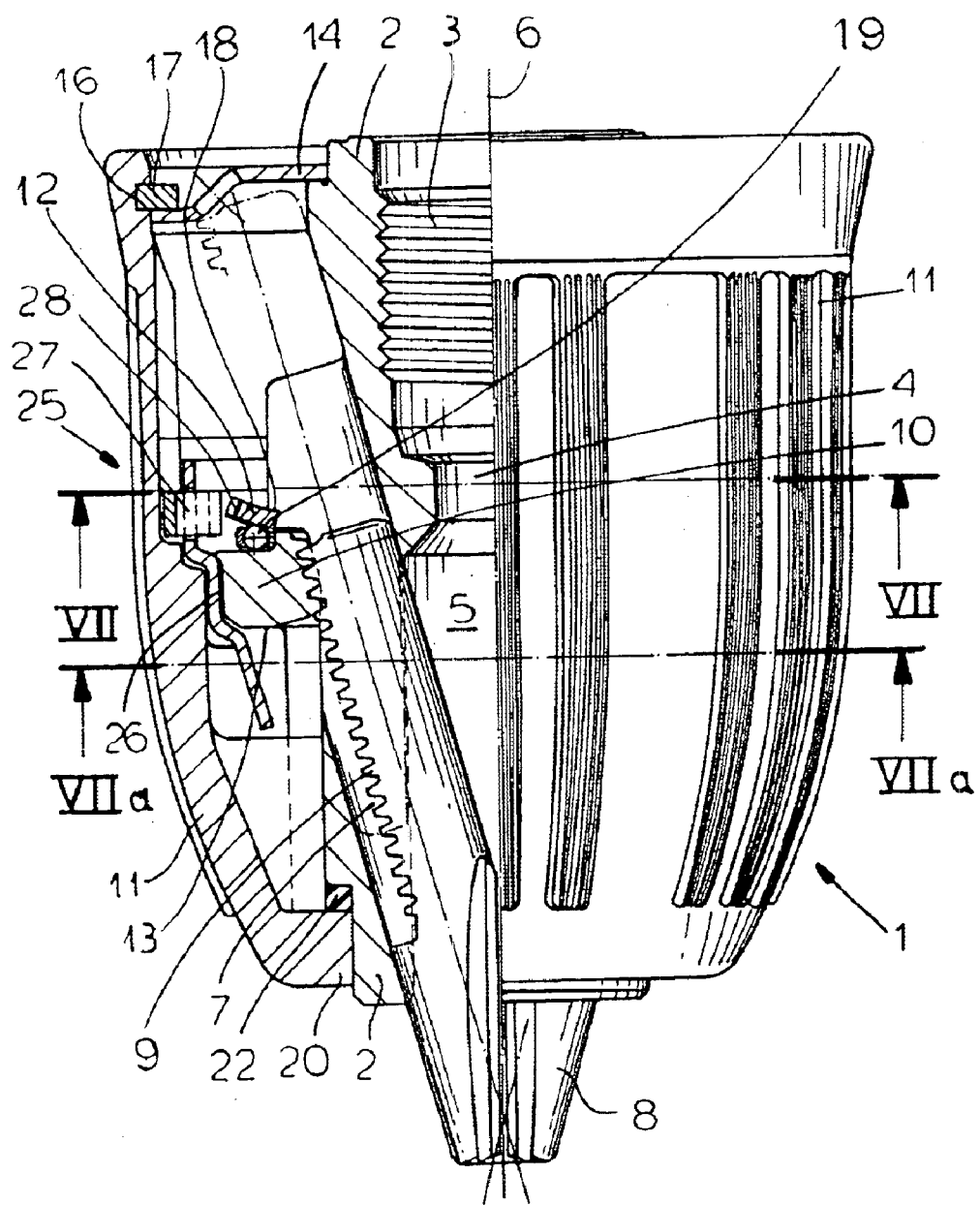
FIG. 3 is a view like FIG. 1 of the FIG. 2 chuck in the tightened position.

As seen in the drawing, a chuck 1 according to the invention has a machined steel body 2 centered on an axis 6 and formed with an axially rearwardly open threaded bore 3 adapted to receive a spindle of a power unit, an axially forwardly open seat 5 adapted to receive the shank of a tool, and a passage 4 connecting the bore 3 and seat 5 so that, if desired, a hammer rod can act directly on the rear end of a tool shank in the seat 5. Three angled guide passages 7 equispaced about the axis 6 open axially forward into the seat 5 and each hold a respective slidable steel jaw 8 having an outer edge formed with a screwthread 9 meshing with an internal screwthread 15 of a one-piece tightening ring 10 splined to the inside of a tightening sleeve 11 coaxially surrounding the chuck body 2 and extending its full axial length.

A spring steel washer 12 has an inner periphery bearing axially rearward on an axially forwardly facing shoulder 18 of the body 2 and bears axially forward on balls 19 riding on a rear face of the ring 10. The ring 10 bears axially forward on an axially rearwardly directed shoulder 13 of the sleeve 11 so that the sleeve 11 cannot move axially rearward relative to the ring 10 and in fact can be considered to be axially locked to the ring 10. The shoulder 18 has a radial dimension equal here to about 25% of the radial dimension of the washer 12, although it could in some applications be as much as 70%. Thus the washer 12 can be deflected backward when pushed by the balls 19 which engage the washer 12 radially outward of the shoulder 18.

Another spring washer 14 has its inner periphery bearing axially forward on an axially rearwardly directed shoulder 21 of the body 2 and an outer periphery bearing axially rearward on a snap ring 17 set in an inwardly open groove 16 at the rear end of the sleeve 11. Thus this washer 14 pulls the sleeve 11 backward, pressing its shoulder 13 against the ring 10 and pressing the ring 10 via the balls 19 against the spring washer 12 set in the body 2. The washer 14 is softer than the washer 12 so that it presses the balls 19 against the washer 12 without significantly deforming it.

In addition the front end of the sleeve 11 is formed with an inwardly directed rim or ridge 20 that bears axially rearward via an elastomeric O-ring 22 on a forwardly directed shoulder of the body 2. Thus the sleeve 11 is limitedly elastically movable axially relative to the body 2, braced in both directions by the spring washers 12 and 14. The spacing between the rear face of the rim 20 and the complementary confronting front face of the body 2 is equal to the maximum axial displacement of the sleeve 11 on the body 2.

Figure 4:
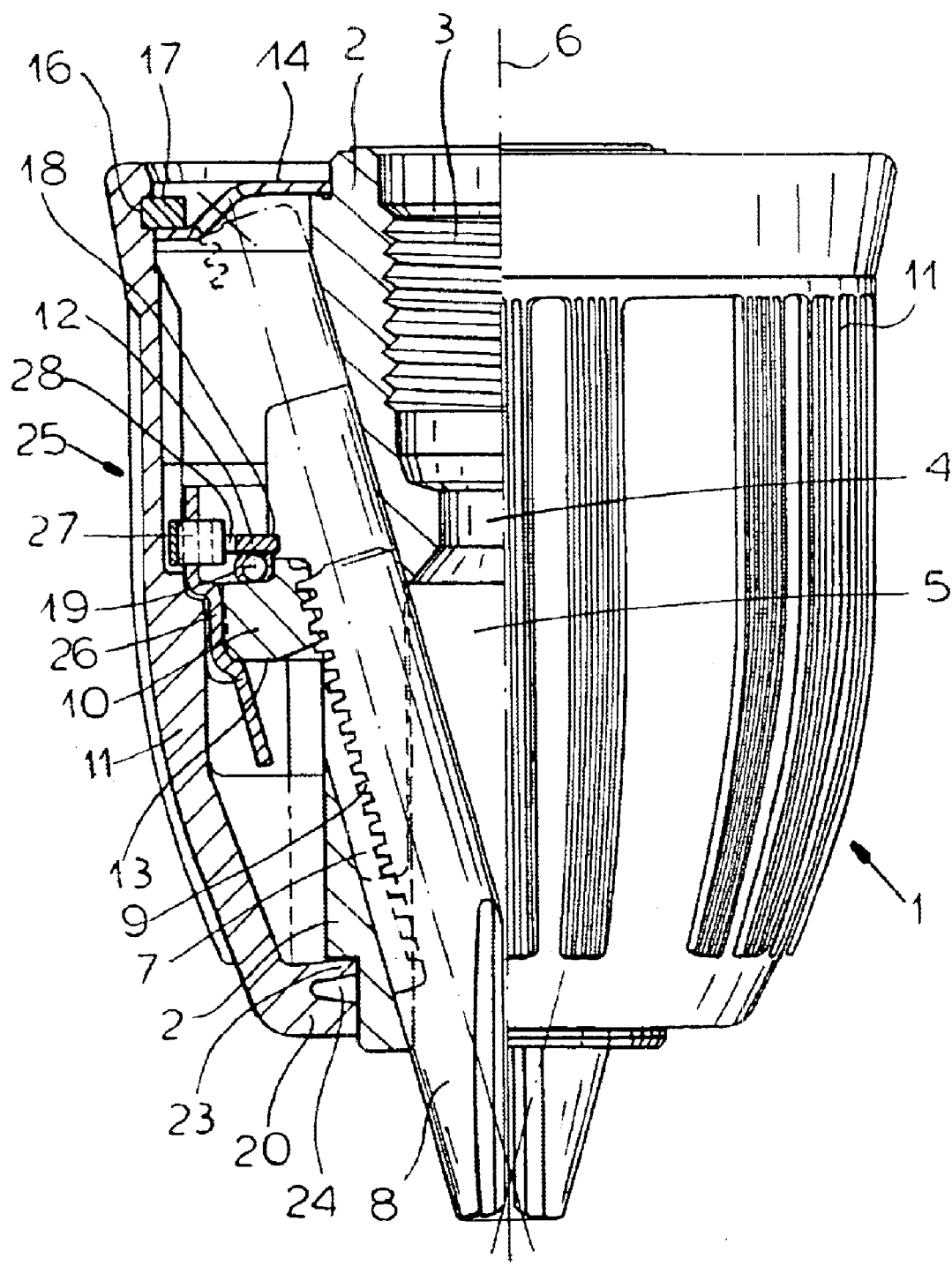
FIG. 4 is a view like FIG. 1 of a variant on the FIG. 2 chuck.
Figure 5:
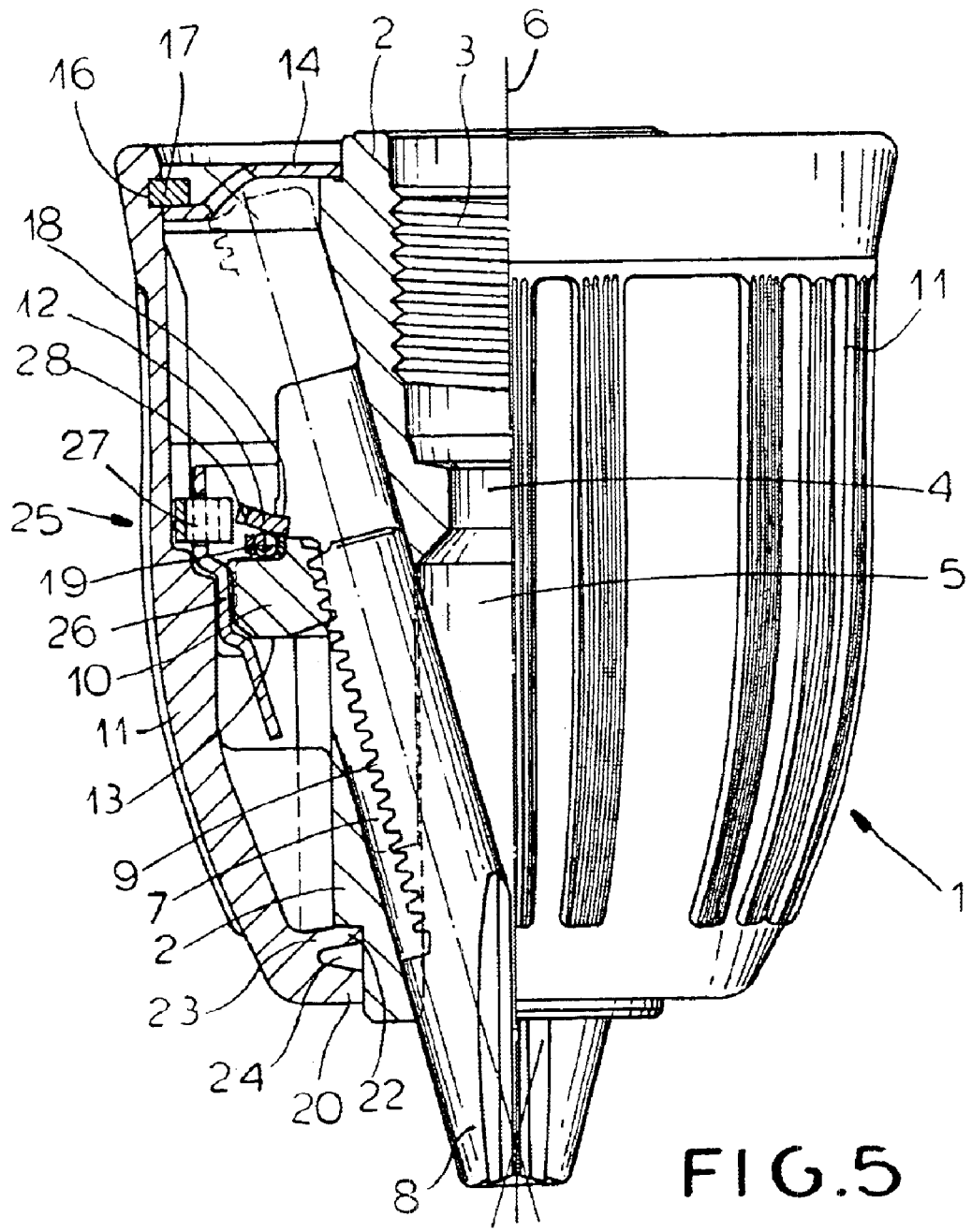
FIG. 5 is a view like FIG. 1 of the FIG. 4 chuck in the tightened position.
Figure 6:
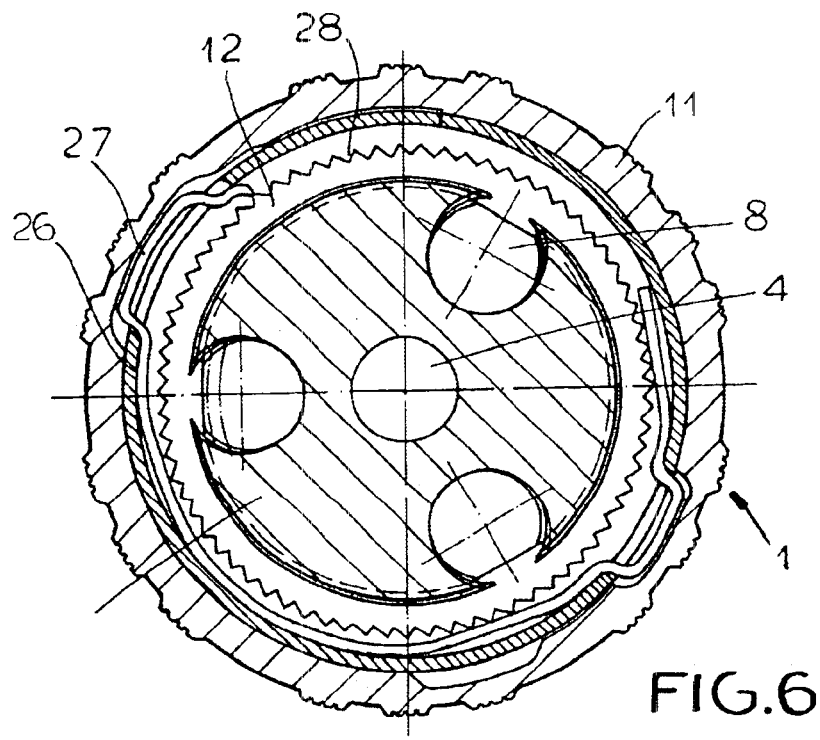
FIGS. 6 and 6a are cross sections taken along respective lines VI—VI and VIa—VIa of FIG. 2.
Figure 6A:
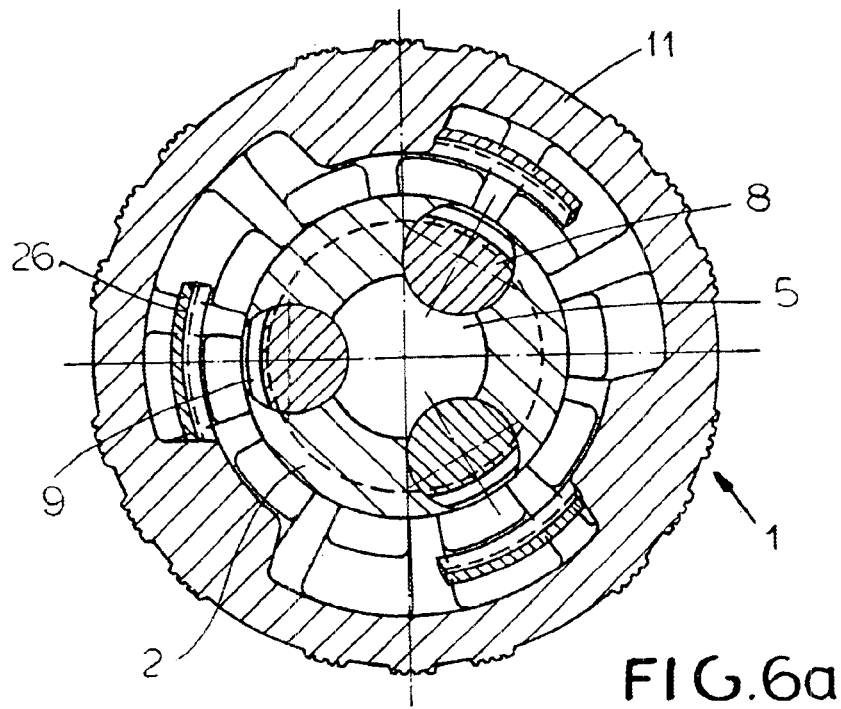
Figure 7:
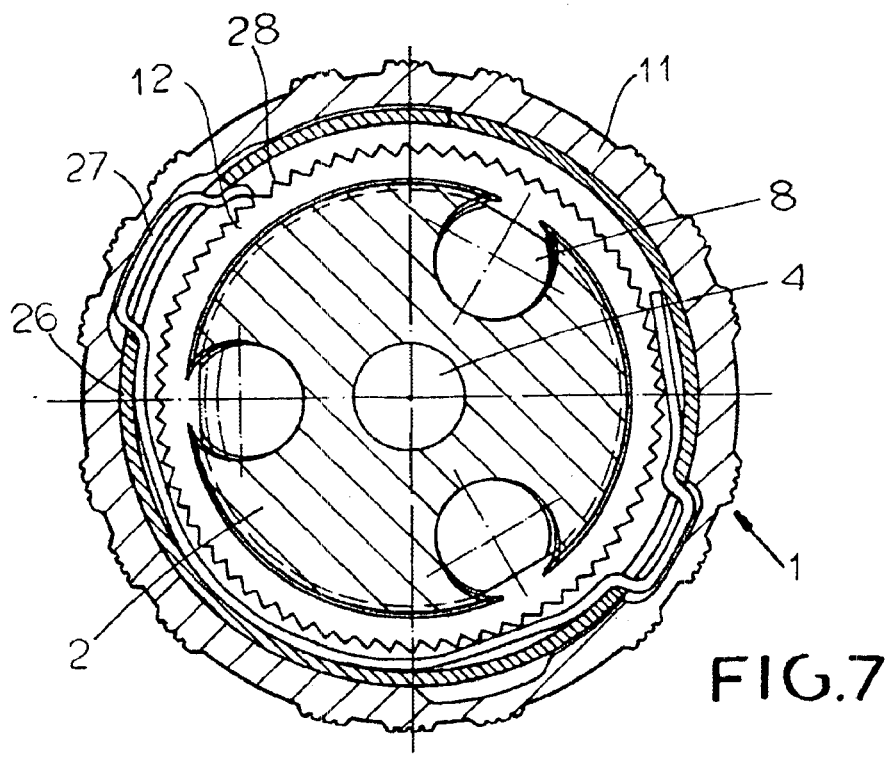
FIGS. 7 and 7a are cross sections taken along respective lines VII—VII and VIIa—VIIa of FIG. 3.
Figure 7A:
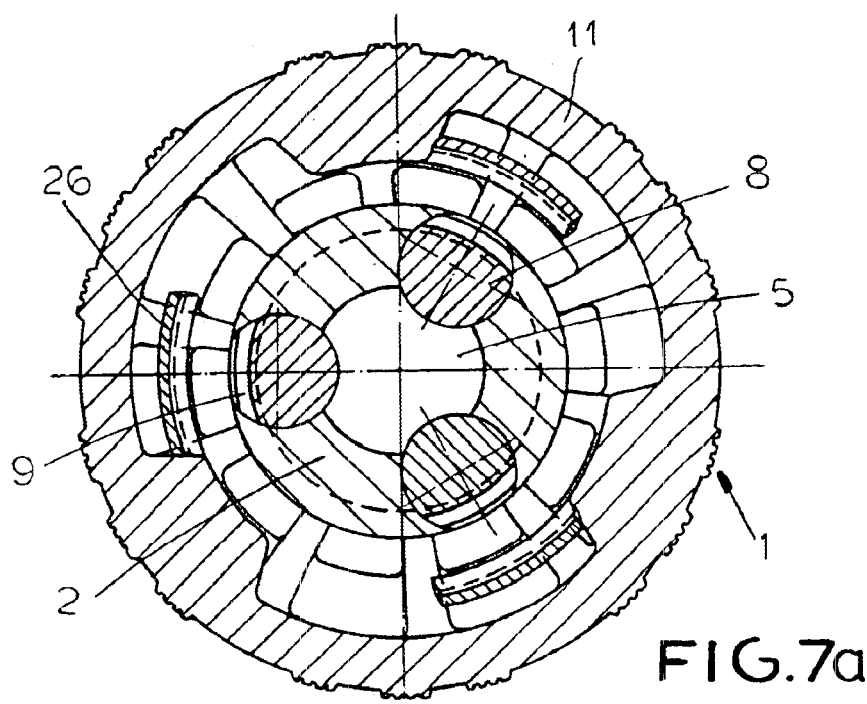

Instead of the O-ring 22, FIG. 4 shows an arrangement wherein the front rim 20 is formed with a radially inwardly open groove 24 forming an elastically deformable lip 23 bearing axially rearward on the chuck body 2. The material of the sleeve 11 is sufficiently elastically deformable that the lip 23 can be deformed axially forward to close the groove 24 without plastic deformation.

While the embodiment of FIG. 1 is a simple chuck, the embodiments of FIGS. 2 through 5 have latching mechanisms 25 as described in commonly owned U.S. Pat. No. 5,765,839. These mechanisms comprise an intermediate sleeve 26 fixed on the ring 10 and holding a latching member 27 engageable with external teeth 28 of the washer 12. These teeth 28 could also be formed on the body 2 in which case they would have an axial length greater than the axial displacement of the sleeve 11 relative to the body 2. The sleeve 11 is limitedly angularly movable relative to the latching member 27 so that it can press its end into engagement with the teeth 28 and thereby form a one-way coupling allowing forward rotation of the sleeve 11 in a tightening direction while impeding backward rotation as is described in detail in above-cited U.S. Pat. No. 5,765,839.

Figure 8:
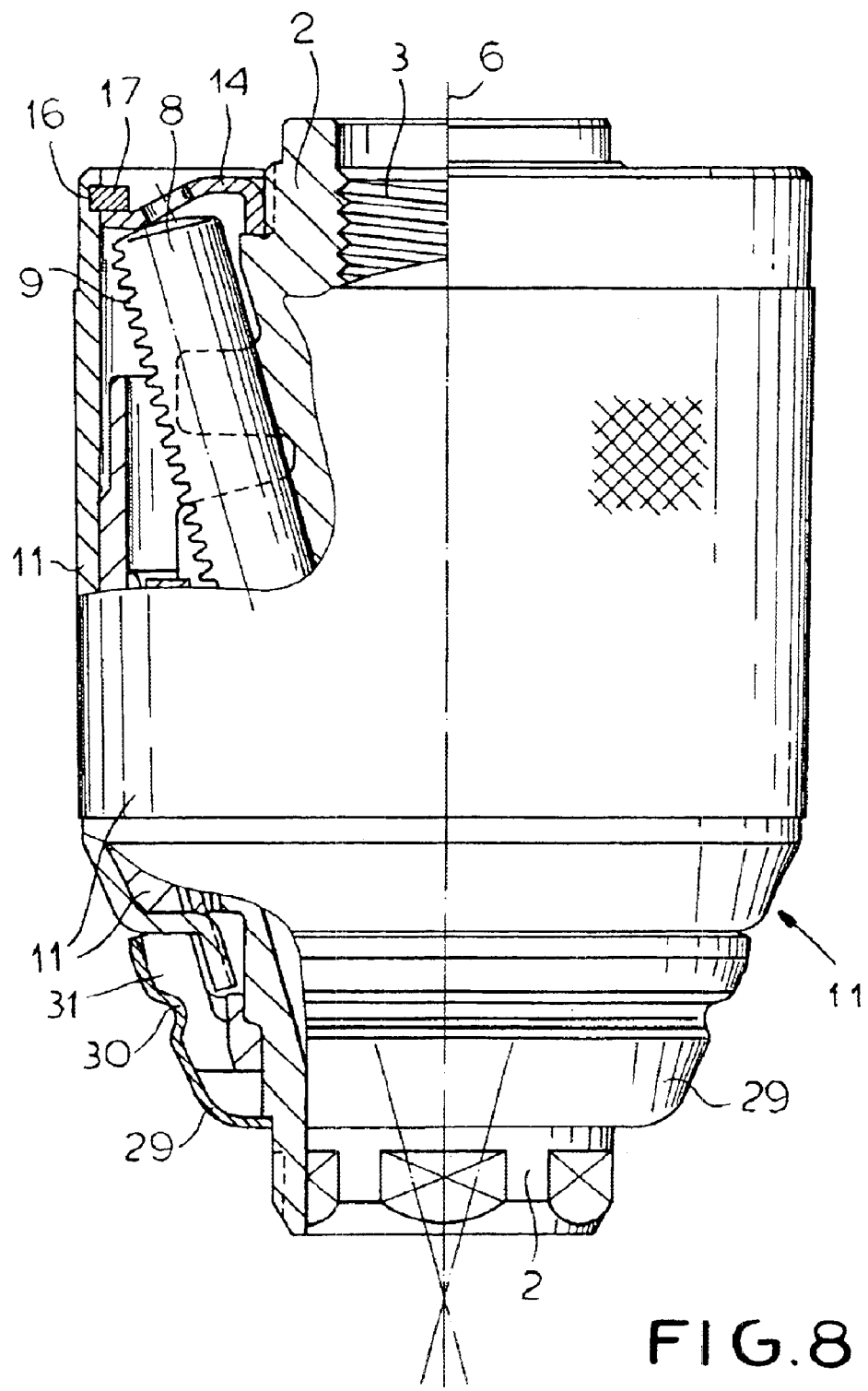
FIG. 8 is a side view partly in section of another chuck in accordance with the invention.

FIG. 8 shows how a shield sleeve 29 is mounted on the front end of the chuck. It is formed with a radially inwardly projecting groove 30 fitted in a seat of a nut 31 carried on the inner end of the body 2. The groove 30 can be formed by embossing after the cap 29 is mounted on the chuck.

I claim:

1. A drill chuck comprising:
   a chuck body centered on and adapted to be rotated about a longitudinal axis and unitarily formed with a plurality of forwardly open angled guides angularly spaced about the axis;
   respective jaws displaceable along the guides in the chuck body and each formed with a row of teeth;
   a tightening sleeve rotatably surrounding the body and with a rim;
   a ring rotatable on the body about the axis, axially fixed to the sleeve, and formed with a screwthread meshing with the teeth of the jaws, whereby rotation of the ring in one direction moves the jaws radially together and opposite rotation moves them radially apart;
   a first axially elastically deformable spring seated in the chuck body and bearing axially forward on the ring; and
   a second axially elastically deformable spring seated in the chuck body and bearing axially rearward on the sleeve, the rim bearing on the chuck body on axial rearward displacement of the sleeve relative to the chuck body.

2. The drill chuck defined in claim 1 wherein the sleeve has an axially rearwardly directed shoulder and the ring is pressed axially forwardly thereagainst by the first spring.

3. The drill chuck defined in claim 2 wherein the second spring is a spring washer.

4. The drill chuck defined in claim 3 wherein the sleeve is provided with an inwardly projecting abutment ring bearing axially forward on the spring washer.

5. The drill chuck defined in claim 1 wherein the body has an axially forwardly directed shoulder bearing on the first spring and the first spring projects radially substantially past the shoulder.

6. The drill chuck defined in claim 5 wherein between 25% and 70% of the first spring bears directly on the shoulder.

7. The drill chuck defined in claim 1 wherein on tightening of the chuck the sleeve moves axially backward on the chuck body with elastic deformation of the first spring through a predetermined distance and when the chuck is loose the rim is spaced the distance from the chuck body.

8. The drill chuck defined in claim 7 wherein the rim is axially forward of the ring.

9. The drill chuck defined in claim 7 wherein the rim is an inwardly projecting ridge at a front end of the chuck body.

10. The drill chuck defined in claim 9, further comprising
an elastically deformable body between the rim and the chuck body.

11. The drill chuck defined in claim 10 wherein the elastically deformable body is a ring.

12. The drill chuck defined in claim 10 wherein the elastically deformable body is a lip on the sleeve.

13. The drill chuck defined in claim 12 wherein the lip is unitarily formed with the sleeve.

14. The drill chuck defined in claim 1 wherein the ring is formed unitarily of a single piece.

15. The drill chuck defined in claim 1, further comprising
a latch mechanism engaged between the sleeve and the body for inhibiting rotation of the sleeve on the body.

16. The drill chuck defined in claim 15 wherein the mechanism includes
an intermediate sleeve fixed angularly to the ring,
a radially displaceable latch member operable by tightening sleeve and angularly coupled to the intermediate sleeve, and
teeth angularly fixed relative to the body and latchingly engageable with the latch member.

17. The drill chuck defined in claim 16 wherein the teeth are formed on the first spring.

18. The drill chuck defined in claim 1, further comprising
a shield cap rotatable on the sleeve at a front end of the chuck body.

19. The drill chuck defined in claim 18 wherein the sleeve carries a mounting nut and the cap has a radially inwardly projecting formation set in the nut.

* * * * *